United States Patent
Kamiya et al.

(10) Patent No.: US 9,235,776 B2
(45) Date of Patent: Jan. 12, 2016

(54) PERSON DETECTION APPARATUS

(71) Applicant: DENSO CORPORATION, Kariya, Aichi-pref. (JP)

(72) Inventors: Yasunori Kamiya, Toyota (JP); Naoki Sugiyama, Obu (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/397,970

(22) PCT Filed: May 13, 2013

(86) PCT No.: PCT/JP2013/003041
§ 371 (c)(1),
(2) Date: Oct. 30, 2014

(87) PCT Pub. No.: WO2013/186984
PCT Pub. Date: Dec. 19, 2013

(65) Prior Publication Data
US 2015/0117790 A1    Apr. 30, 2015

(30) Foreign Application Priority Data
Jun. 11, 2012 (JP) .................. 2012-131959

(51) Int. Cl.
*G06K 9/46* (2006.01)
*G06K 9/00* (2006.01)
(Continued)

(52) U.S. Cl.
CPC .............. *G06K 9/46* (2013.01); *G06K 9/00221* (2013.01); *G06K 9/6292* (2013.01);
(Continued)

(58) Field of Classification Search
CPC ....................................................... G06K 9/46
USPC ....................................................... 382/203
See application file for complete search history.

(56) References Cited

U.S. PATENT DOCUMENTS

2005/0276447 A1    12/2005  Taniguchi et al.
2014/0348383 A1*   11/2014  Kamiya ............ G06K 9/00362
                                                       382/103
2015/0117773 A1*   4/2015   Kamiya ............ G06K 9/00362
                                                       382/165

FOREIGN PATENT DOCUMENTS

JP    H07-65149 A    3/1995
JP    H07-73298 A    3/1995
(Continued)

OTHER PUBLICATIONS

International Search Report of the International Searching Authority mailed Jun. 25, 2013 in the corresponding PCT application No. PCT/JP2013/003041 (and English translation).
(Continued)

*Primary Examiner* — Ruiping Li
(74) *Attorney, Agent, or Firm* — Posz Law Group, PLC

(57) ABSTRACT

A person detection apparatus determines a weather condition such as rain and solar radiation based on a variety of information from a weather information input portion. Then, based on a determination result of the weather condition, the umbrella ratio showing the ratio of persons with umbrellas is calculated. The person detection apparatus uses a no-umbrella recognition model describing a person with no umbrella and an umbrella-hold recognition model describing a person with umbrella in order to perform pattern recognition to an input image to derive recognition scores based on the respective recognition models. Then, the umbrella ratio depending on the weather condition is used to correct the respective recognition scores based on the pattern recognition using the no-umbrella model and the recognition score based on the pattern recognition using the umbrella-hold model; the corrected recognition scores are output as a final detection result.

2 Claims, 4 Drawing Sheets

(51) Int. Cl.
*G06K 9/62* (2006.01)
*G06K 9/68* (2006.01)
*G06K 9/72* (2006.01)
*G06T 7/00* (2006.01)
*G08G 1/16* (2006.01)

(52) U.S. Cl.
CPC ............. *G06K 9/6807* (2013.01); *G06K 9/726* (2013.01); *G06T 7/0046* (2013.01); *G08G 1/166* (2013.01); *G06K 2209/27* (2013.01); *G06T 2207/20076* (2013.01); *G06T 2207/20081* (2013.01); *G06T 2207/30196* (2013.01)

(56) References Cited

FOREIGN PATENT DOCUMENTS

| | | |
|---|---|---|
| JP | 2006-99611 A | 4/2006 |
| JP | 2009-122786 A | 6/2009 |
| JP | 2010-79716 A | 4/2010 |

OTHER PUBLICATIONS

Written Opinion of the International Searching Authority mailed Jun. 25, 2013 in the corresponding PCT application No. PCT/JP2013/003041 (and English translation).

* cited by examiner

PERSON DETECTION APPARATUS

CROSS REFERENCE TO RELATED APPLICATION

The present disclosure is a U.S. national stage application of PCT/JP2013/003041 filed on May 13, 2013 and is based on Japenese Patent Application No. 2012-131959 filed on Jun. 11, 2012, the disclosures of which are incorporated herein by reference.

TECHNICAL FIELD

The present disclosure relates to a person detection apparatus that detects a person from an input image by use of pattern recognition.

BACKGROUND ART

Conventionally, as an art of detecting persons in front of or behind, for example, a vehicle, the art of detecting persons in an input image has been known by performing pattern recognition to an image (input image) captured by a camera etc. by use of recognition models to recognize the persons in the input image.

Patent Literature 1 describes the art of detecting a pedestrian by comparing a captured image by a capturing means with template data for pedestrian detection (recognition models) to determine an obstruction between the detected pedestrian and a host vehicle.

PRIOR ART LITERATURES

Patent Literature

Patent Literature 1: JP 2010-079716 A

SUMMARY OF INVENTION

By the way, the pattern recognition of the prior art using recognition models of persons poses an issue that reduces the reliability of detection of persons who use weather protectors such as umbrellas (umbrellas against rain and umbrellas against sun). This is because, when part of a body, such as the head of a person, is hidden by using, e.g., an umbrella, the profile around the head of the person is different from that with no umbrella to cause a mismatch of the image of the person in the input image with the recognition model.

It is an object of the present disclosure to provide an art of improving a recognition ratio of persons whose bodies are partially hidden by protectors such as umbrellas by making a pattern recognition technique reflect a weather condition.

An aspect of the present disclosure to achieve the above object is related to a person detection apparatus that detects a person from an input image captured by a capturing portion through pattern recognition using a recognition model to recognize a person. The person detection apparatus according to the aspect is characterized by including a storage portion, a weather determination section, and a person recognition section.

The storage portion stores a protector-hold recognition model describing a person who is using a protector against a specific weather. The weather determination section determines a weather condition based on a detection result by a weather detection portion. The person recognition section performs a pattern recognition to the input image by using the protector-hold recognition model stored in the storage portion, and outputs, as a recognition result, a weather reflection score that is calculated by reflecting an influence depending on a weather condition determined by the weather determination section in a score of a result of performing the pattern recognition.

A gist in the aspect is to consider the fact that the ratio of persons who use protectors against a specific weather is dependent on a weather condition, apply the information about the weather condition to a technique of pattern recognition for persons, and thereby reduce the negative impact on the recognition capability when persons use protectors such as umbrellas.

For example, the influence of the recognition result based on a protector-hold recognition model may be increased on the basis of the assumption that, when a specific weather condition is detected, the ratio of persons who use protectors against the weather becomes high. As a result, the recognition ratio of the persons who use protectors is improvable. On the contrary, the influence of the recognition result based on the protector-hold recognition model may be reduced on the basis of the assumption that, when a specific weather condition is not detected, the ratio of persons who use protector against the weather becomes low. As a result, the recognition ratio of other than persons who are using protectors is improvable.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Hereinafter, an embodiment of the present disclosure is described based on the figures. Note that the present disclosure is not limited to the following embodiments at all, but performable in various modes.

Note that, in the present application, "information" is used not only as an uncountable noun but also as a countable noun.

[Explanation of Configuration of Person Detection System]

Figure 1:
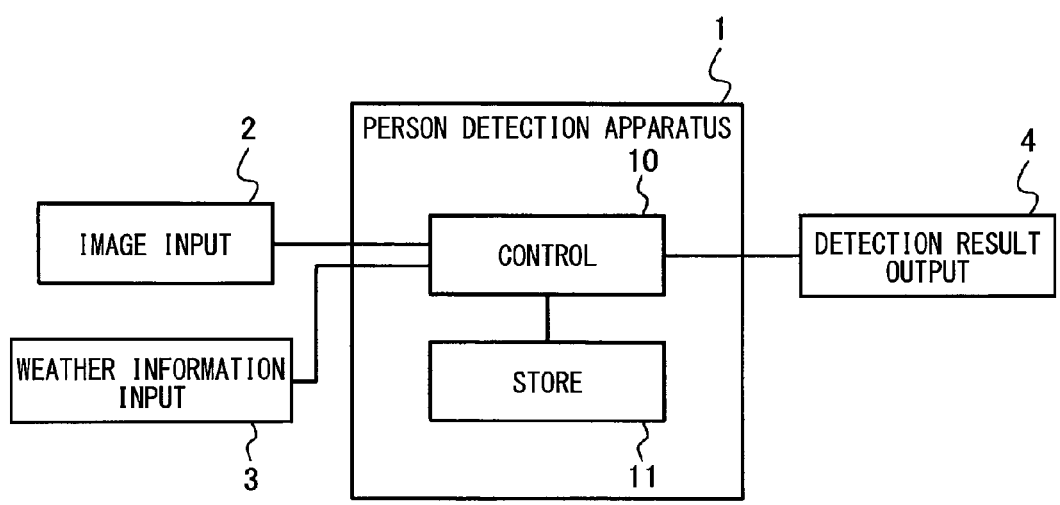
FIG. 1 is a block diagram showing a schematic configuration of a person detection system.

A person detection system of the embodiment is mounted to a vehicle etc., and used to detect persons in front of the vehicle. As shown in FIG. 1, the person detection system includes a person detection apparatus 1 and other portions such as an image input portion 2, a weather information input portion 3, a detection result output portion 4, which are connected to the person detection apparatus 1.

The person detection apparatus 1 is an image processing apparatus that detects an image of a person from an input image through the pattern recognition using recognition models, and includes a control circuit 10 and a storage portion 11.

The control circuit 10 includes a well-known information processor or computer having a CPU, a ROM, a RAM, an input-output interface, etc. that are not illustrated, and processes input images from the image input portion 2 to output detection results of persons. The control circuit 10 detects an image of a person in an input image through a well-known pattern recognition technique using recognition models of persons. The embodiment has a feature in that the control circuit 10 outputs as a final detection result a score that is calculated by reflecting the influence determined based on a weather condition in a recognition result using a recognition model of a person with no umbrella and a recognition result using a recognition model of a person with an umbrella. The detailed procedure will be mentioned later.

The storage portion 11 stores, e.g., data of person recognition models for use in pattern recognition. In the embodiment, in addition to a typical recognition model describing a person with no umbrella (hereinafter also called a no-umbrella recognition model), a recognition model describing a person with an umbrella such as an umbrella against sun and an umbrella against rain (hereinafter also called an umbrella-hold recognition model) is stored in the storage portion 11.

Figure 2:
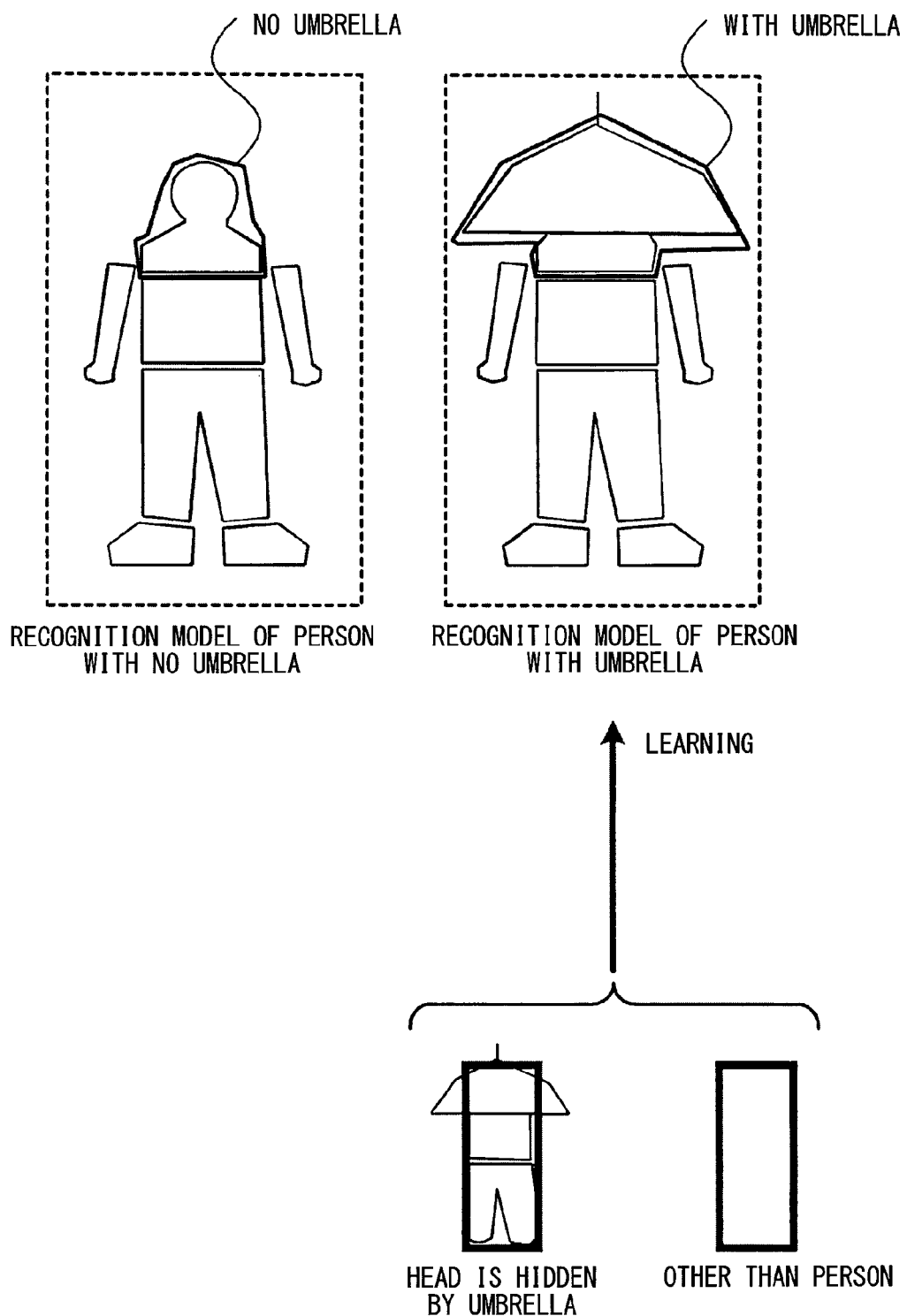
FIG. 2 is an explanatory view schematically showing an overview of recognition models.

The overview of the no-umbrella recognition model that describes a person with no umbrella and the umbrella-hold recognition model that describes a person with an umbrella is shown in FIG. 2. The umbrella-hold recognition model is different from the typical no-umbrella recognition model in that the head area is covered with the profile describing an opened umbrella. The application of such an umbrella-hold recognition model to pattern recognition includes two main techniques as follows. One is to prepare an umbrella-hold model in models that describe overall bodies of persons for use in pattern recognition: the umbrella-hold model describes an overall body having an umbrella. Another is to prepare a no-umbrella recognition model in recognition models describing respective parts of a human body for use in pattern recognition: the no-umbrella recognition model is prepared by replacing a recognition model describing a head area of a person having no umbrella with a recognition model describing an umbrella.

Note that the umbrella-hold recognition model is produced by the learning with input images. The learning of the umbrella-hold recognition model is performed by extracting features of the profiles of persons including umbrellas from informations about the images of persons whose heads are hidden by umbrellas and about the images of other than persons.

FIG. 1 is explained again. The image input portion 2 includes, e.g., an onboard camera to capture the front of a vehicle. The image input portion 2 is also referred to as a capture portion. Images captured by the image input portion 2 are input into the control circuit 10 of the person detection apparatus 1 as input images.

The weather information input portion 3 includes onboard apparatuses that input various informations into the person detection apparatus 1 to determine a weather condition in a current location of a vehicle. Specifically, such onboard apparatuses include a wiper switch to operate a wiper of a car window, a rain sensor, and an illuminance sensor. In the embodiment, on the basis of an operation state of the wiper and a measurement result of rainfall by the rain sensor, the control circuit 10 determines the presence or absence of rain or the intensity of rain. Based on a measurement result of the illuminance sensor, the control circuit 10 determines solar intensity in fine weather etc.

The detection result output portion 4 is an onboard apparatus that, for example, warns a driver about the existence of a person and controls a vehicle in response to a result of detection of the person by the person detection apparatus 1.

This type of onboard apparatus includes a control apparatus for a vehicular drive safety system or a drive assist system.

[Explanation of Person Detection Processing]

Figure 3:
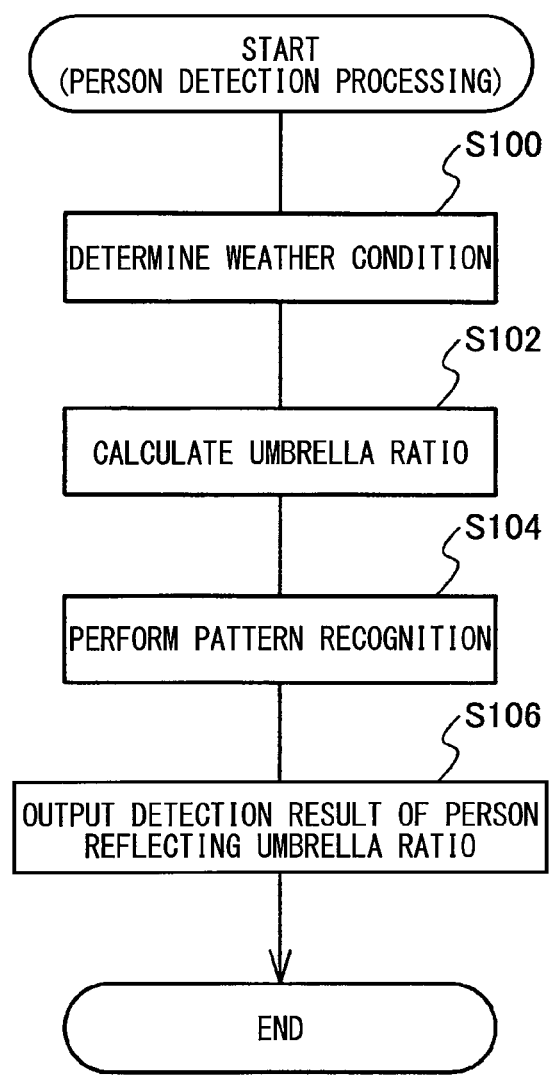
FIG. 3 is a flowchart showing person detection processing.
Figure 4:
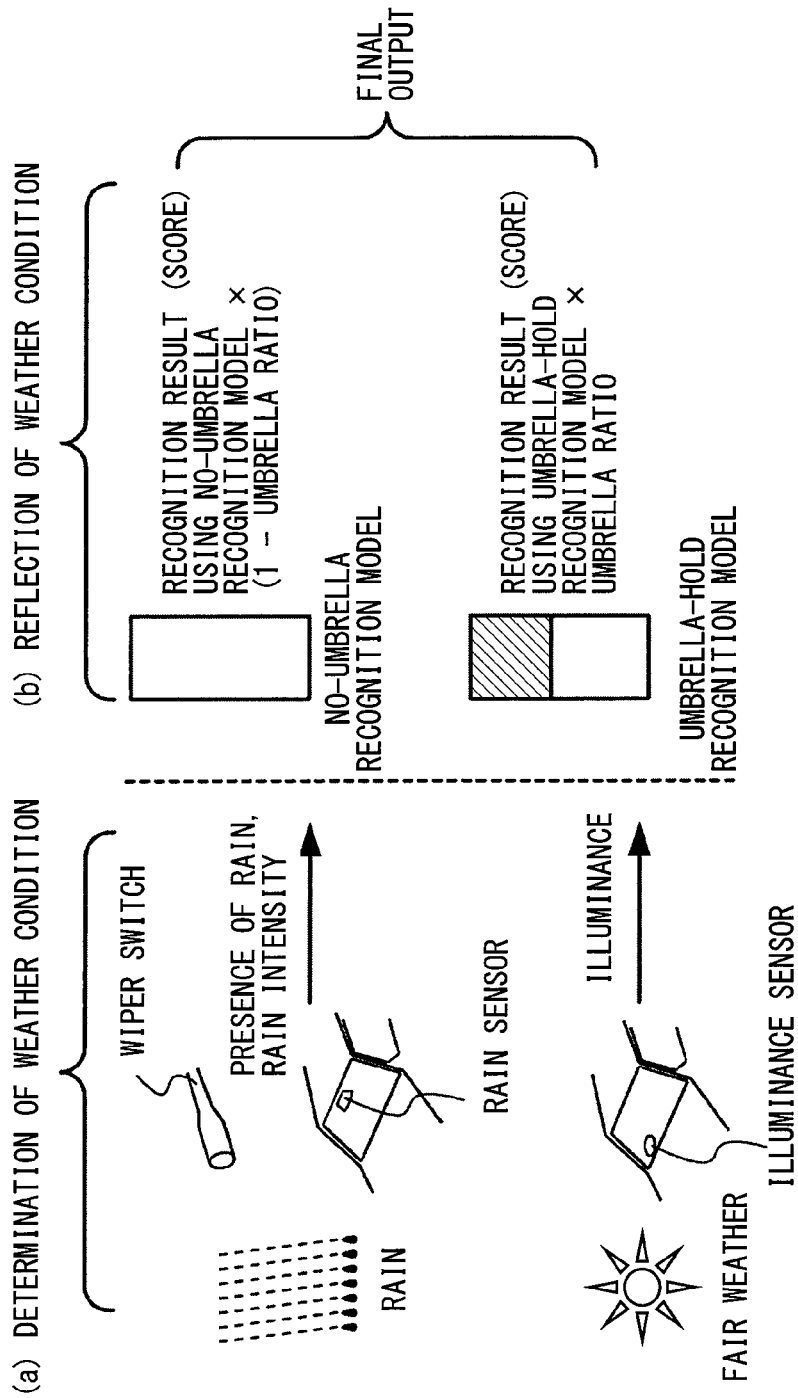
FIGS. 4(*a*) and 4(*b*) are explanatory views schematically showing an overview of person recognition reflecting a weather condition.

A procedure of the person detection processing performed by the control circuit 10 of the person detection apparatus 1 is explained referring to the flowchart of FIG. 3 and to FIG. 4.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

In S100, the control circuit 10 determines a present weather condition on the basis of various informations acquired from the weather information input portion 3. In the embodiment, a weather condition to be determined includes, as shown in FIG. 4(a), the presence or absence of rain or the intensity of rain based on the wiper switch or rain sensor, and solar intensity based on the illuminance sensor.

In S102, the umbrella ratio is calculated based on the weather condition determined in S100. The umbrella ratio is a value showing the ratio of persons who use umbrellas against rain or umbrellas against sun in the present weather condition. In the embodiment, the following formulae (1) to (4) are exemplified as a calculation technique of the umbrella ratio.

Umbrella ratio=Rain related output (Type 1 or Type 2)+Solar related output     (1)

Rain related output (Type 1)=0 (no rain) or α(raining, 0 to 1.0)     (2)

Rain related output (Type 2)=Rain intensity×Rain coefficient     (3)

Solar related output=(Illumination−Threshold)×Solar coefficient     (4)

Note that the rain related output uses any one of the calculation techniques of Types 1 and 2 in accordance with the technique of detecting a rain condition. The rain related output of Type 1 is used when only the presence or absence of rain is detected. The rain related output of Type 2 is used when rain intensity is detected. The rain coefficient, threshold, and solar coefficient are predetermined design values.

In S104, an input image from the image input portion 2 is scanned using the no-umbrella recognition model and umbrella-hold recognition model to perform pattern recognition. Here, the degree of agreement (recognition score showing pedestrian-likelihood) is calculated at each position of the input image: the degree of agreement is in between the input image and each of the no-umbrella recognition model and umbrella-hold recognition model.

Then, in S106, as shown in FIG. 4(b), the umbrella ratio calculated in S102 is applied to each of the recognition score using the no-umbrella recognition model and the recognition score using the umbrella-hold recognition model to calculate a corrected weather reflection score. Then, the calculated weather reflection score is output as a final detection result of the person.

The technique of reflection of the umbrella ratio in the recognition scores may include the following. For example, the correction is performed to make the recognition score using the umbrella-hold model relatively higher as the umbrella ratio is larger, in other words, as the ratio of persons with umbrellas is higher. Such a way improves the recognition ratio of persons with umbrellas. On the contrary, the correction is performed to make the recognition score using the umbrella-hold model relatively smaller as the umbrella ratio is smaller, in other words, as the ratio of persons with umbrellas is lower.

Note that, in the embodiment, the following formulae (5) and (6) are exemplified as the techniques of calculating weather reflection scores corresponding to the no-umbrella recognition model and umbrella-hold recognition model.

$$\text{Weather reflection score (with no umbrella)} = \text{Recognition score with no umbrella} \times (1 - \text{umbrella ratio}) \quad (5)$$

$$\text{Weather reflection score (with umbrella)} = \text{Recognition score with umbrella} \times \text{umbrella ratio} \quad (6)$$

Note that, regardless of a weather condition, only the recognition ratio based on the umbrella-hold recognition model may be changed without changing the recognition ratio based on the typical no-umbrella recognition model. In that case, the umbrella ratio is not reflected in the recognition score based on the no-umbrella recognition model, but is reflected only in the recognition score based on the umbrella-hold recognition model.

[Advantageous Effect]

The person detection apparatus 1 of the embodiment provides the following advantageous effect.

The information on a weather condition is applied to the technique of the pattern recognition for persons in consideration that the ratio of persons who use umbrellas against sun or umbrellas against rain is dependent on the weather condition. This can reduce a negative impact on the recognition ability when persons use umbrellas.

In the embodiment, the control circuit 10 determines the umbrella ratio showing the ratio of persons with umbrellas in accordance with the presence or absence of rain, the intensity of rain, or the solar intensity. Then, the control circuit 10 corrects respective recognition scores based on the pattern recognition using the respective no-umbrella and umbrella-hold recognition models by use of the umbrella ratio depending on a weather condition and outputs them as a final detection result.

Specifically, the influence of the recognition result using the umbrella-hold recognition model can be relatively large on the assumption that the ratio of persons who use umbrellas against rain or umbrellas against the sun becomes high when rain or strong solar radiation is detected. This can increase the recognition ratio of persons with umbrellas. On the contrary, the influence of the recognition result using the umbrella-hold recognition model can be reduced on the assumption that the ratio of persons with umbrellas against rain or umbrellas against sun is low when rain or strong solar radiation is not detected. This can increase the recognition ratio of other than persons with umbrellas and acquire appropriate detection results of persons.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A person detection apparatus that detects a person from an input image captured by a capturing portion through pattern recognition using a recognition model to recognize a person, the apparatus comprising:
    a storage portion that stores a protector-hold recognition model describing a person who is using a protector against a specific weather and a no-protector recognition model describing a person who is using no protector;
    a weather determination section that determines a weather condition based on a detection result by a weather detection portion; and
    a person recognition section that
        performs pattern recognitions to the input image by using the protector-hold recognition model and the no-protector recognition model, which are stored in the storage portion,
        applies a ratio of an influence on the protector-hold recognition model and a ratio of an influence on the no-protector recognition model, in accordance with a determination result of a weather condition by the weather determination portion, and
        outputs, as a recognition result, a weather reflection score that is calculated by reflecting the ratio of the influence on the protector-hold recognition model and the ratio of the influence on the no-protector recognition model, respectively, in a result of performing the pattern recognition using the protector-hold recognition model and a result of performing the pattern recognition using the no-protector recognition model.

2. The person detection apparatus according to claim 1 wherein:
    the weather determination section determines a presence or absence of a specific weather or an intensity of a specific weather; and
    the person recognition section outputs, as a recognition result, a weather reflection score that is acquired by reflecting an influence, which is depending on the presence or absence of the specific weather or the intensity of the specific weather determined by the weather determination section, in a score of a result of performing the pattern recognition by using the protector-hold recognition model.

* * * * *